Jan. 22, 1946.   J. I. YELLOTT ET AL   2,393,442
VALVE
Filed July 25, 1942
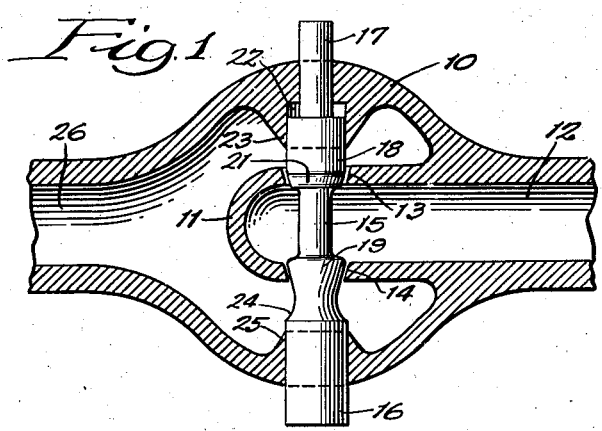
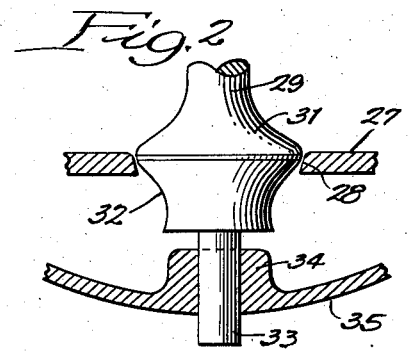
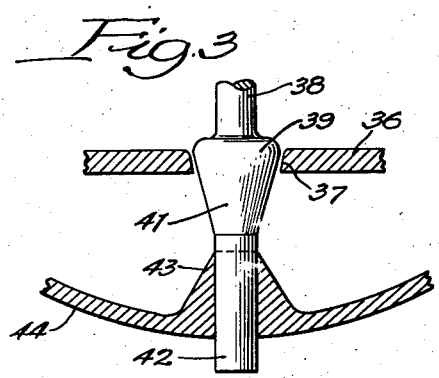
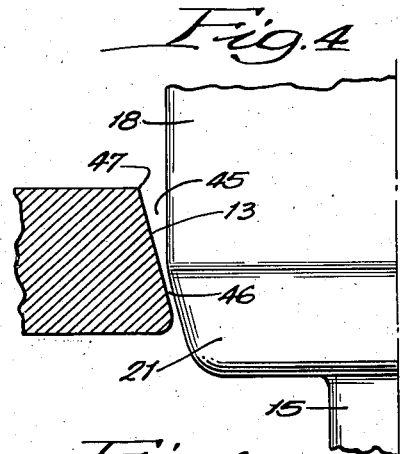
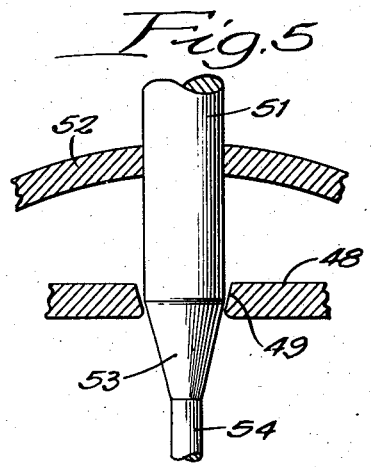
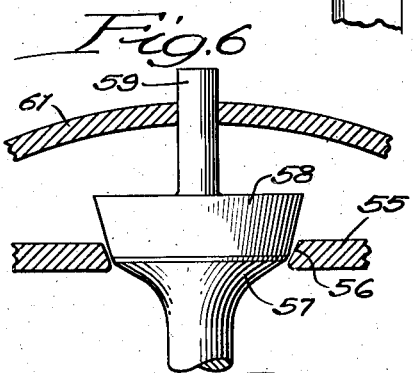
Inventors:
John I. Yellott,
Robert A. Ackley and
Albert J. Rosenberger.
By Darren, Cours and Booth
Attorneys.

UNITED STATES PATENT OFFICE 2,393,442

VALVE

John I. Yellott, Robert A. Ackley, and Albert J. Rosenberger, Chicago, Ill., assignors to Republic Flow Meters Company, Chicago, Ill., a corporation of Illinois Application July 25, 1942, Serial No. 452,300

7 Claims. (Cl. 251—27)

This invention relates to valves and more particularly to a valve construction in which vibration, either audible or inaudible, is eliminated.

It has been found that valves, such for example, pressure reducing or throttling valves, either of the single or multiple port type, tend to set up internal vibrations during use. This is particularly pronounced in the case of extremely high pressure valves used with compressible fluids such as steam. In some instances these vibrations fall within the audible range and cause objectionable whistling while in other cases they may fall within the inaudible range but are still objectionable since they may cause wear and heating or physical vibrations in the valve itself and the associated conduit parts.

We have determined that one of the causes of such vibrations is the stream of flowing fluid vibrating or changing its direction of flow in free space within the valve body. The stream alone, flowing in free space, does not tend to set up objectionable vibrations of itself, but is caused to vibrate by reflected waves or shock waves acting directly on the stream or on the orifice from which the stream issues. If the stream vibrates of itself, as exemplified by the ordinary standing wave, this is not objectionable in the absence of a resonant condition, but where lateral vibrations or changes in direction of the stream in free spaces occur, they are normally objectionable.

According to the present invention, we have determined that objectionable vibrations, both of audible and inaudible type, can be eliminated by directing the stream in such a way that it does not flow through a free space so that it cannot set up such vibrations. This can be accomplished by constraining the stream on at least one side so as to make it flow in contact with a solid wall. In this way lateral vibration of the stream is prevented.

The stream can be so confined by causing it to follow either the valve stem or the seat structure but we have found that it is preferable for the stream to follow the valve stem from the standpoints of both design and operation. In the case of outflow from a diverging seat this can be accomplished by maintaining the stem or a skirt thereon of a diameter at least substantially as great as its maximum diameter in the seat for a substantial distance beyond the seat. In other words, the stem can be cylindrical beyond the seat or can flare out and we have found that a slight inward taper not sufficiently great to cause breaking away of the stream will cause stem flow to be maintained. In the case of inflow toward the stem from a converging seat the stream naturally follows the stem and we have found that best results are obtained by curving the stem to flare the flow gradually away from it so as not to strike any obstructions or projections on the valve body.

Another very important object of the invention is to provide a valve in which the fluid is properly expanded in the flow passage through the seat. We have found that underexpansion is very harmful, causing a flaring flow and creating shock waves tending to throw the stream away from the stem. Excessive overexpansion may tend to cause split flow and flutter but unless the stream is greatly overexpanded smooth stream flow can be obtained. We, therefore, provide a small seating angle between the stem and the seat limiting the angle of divergence of the flow passage to prevent excessive overexpansion while maintaining a sufficient angle and seat length to insure complete expansion of the fluid at maximum valve opening.

Another important feature to be observed is the elimination of resonant spaces across or along which the stream must flow. The most common of such spaces is found in the form of an annulus around the valve stem across the mouth of which the stream flows. This annulus tends to create a free space and enables the stream to set up objectionable vibrations.

However, the mere presence of such an annulus is not in all cases objectionable, and we have found further that when the stream leaves the valve stem at a relatively sharp leaving edge spaced from the valve throat a distance equal to at least five times the width of the throat in the valve seat and is not compelled to flow across a facing edge, vibration does not occur.

Another important feature of the invention relates to the provision of relatively sharp leaving edges at points where it is desired that the stream shall leave a constraining wall. Since it is generally desired that the flow shall follow the valve stem this means that the valve seat should be provided with a relatively sharp edge at its outlet side so that the stream will break away and not tend to follow around the seat.

The above and other objects, advantages, and desirable features of the invention will be better understood from the following description when read in connection with the accompanying drawing, in which—

Figure 1 is a diagramatic view of a complete valve embodying the invention;

Figures 2 and 3 are partial sections of alternative small or inner end constructions;

Figure 4 is an enlarged view illustrating the shape of the flow passage through the seat at the outer or large end; and Figures 5 and 6 are partial sections of alternative outer end constructions.

In previous valve constructions having an enlarged valve head on a reduced stem, we have determined that fluid will not flow smoothly around the head but will tend to curve into the stem at a distance from the head. This creates a dead space around the stem adjacent the head and enables the stream to vibrate laterally to set up objectionable vibrations.

One possible explanation of such vibration is that pressure tends to build up in the dead space until it forces the stream outwardly from the valve stem. As soon as this happens the pressure is relieved and the stream tends to move back. It may also be that the space acts as a resonant space. In any event we have found that with a construction of this kind vibrations occur. In some cases these vibrations may be in the audible range to produce whistling or shrieking while in other cases they may be inaudible but are still objectionable since they produce physical vibration of the valve parts or heating thereof.

Another source of vibrations arises from the fact that a portion of the flow stream tends to follow around the valve seat and along a wall of the valve body in cases where a rounded seat is used. This portion of the stream cannot stay in contact with the wall since its expansion cannot be rapid enough. It therefore tends to spread out in free space within the valve body and can vibrate laterally without constraint. In some cases we have found that the stream will jump back and forth from a position adjacent the valve stem to a position adjacent the seat in which case a very objectionable vibration is set up.

Figure 1 illustrates one valve construction embodying the invention which will eliminate objectionable vibration and which comprises a valve body 10 having an inner closed wall 11 communicating with the valve inlet passage 12. The wall 11 provides two spaced wall portions formed with an outer valve seat 13 and an inner valve seat 14 through which a valve stem 15 extends. At the lower end of the body the valve stem is of full diameter as shown at 16 and slidably fits into the body. At its upper end the valve stem terminates in a reduced portion 17 slidably extending through the body.

The valve stem 15 is formed with two enlarged portions 18 and 19 cooperating respectively with the valve seats 13 and 14. As shown, the upper enlarged portion 18 has a tapered seat portion 21 and extends upwardly therefrom at full diameter into cylindrical cavity 22 in the valve body. The cavity 22 terminates in a flared skirt 23 fitting around the enlarged portion 18 and terminating in a relatively narrow edge facing toward the valve seat 13.

At the lower or inner end of the valve the enlarged portion 19 is provided with a seating portion adapted to seat against the valve seat 14. Below the seating portion the enlargement 19 is tapered inwardly for a short distance and terminates in an outwardly flared part 24 to direct the fluid stream away from the stem. The valve body as shown is formed with a flared skirt portion 25 terminating in a relatively narrow upper edge and fitting around the stem 16 to provide a relatively smooth continuous wall along which the stream may flow.

In operation of this valve, fluid entering through the passage 12 simultaneously flows through the seats 13 and 14 around the enlarged portions on the valve stem. At the upper end the fluid flows along the stem 18 until it strikes the narrow edge of the flared skirt 23 which directs it away from the stem into the main cavity of the valve body. It will be noted that this is a smooth continuous flow so that the stream is kept confined on one side at all times and is given no opportunity to vibrate or flutter in free space.

At the lower end, fluid flowing through the converging valve seat 14 tends to flow inwardly along the stem and will be directed around the curved portion 24 outwardly away from the stem in a smooth continuous path. This fluid is likewise confined on one side at all times and is given no opportunity to flutter or vibrate in free space. The fluid entering the main portion of the valve body through the seats flows outwardly therefrom through an outlet passage 26 without creating any objectionable vibrations.

Figure 2 illustrates an alternative construction of the inner or small end of the valve including a wall portion 27 formed with a valve seat 28 through which a valve stem 29 passes. The stem 29 is formed with an enlarged portion 31 shaped to seat against the seat 28 and terminating beyond the seat in a skirt 32 tapered inwardly and then flared outwardly. The valve stem terminates in a reduced portion 33 slidably extending through a boss 34 on a valve casing 35.

It will be noted that the outlet edge of the skirt portion 32 is of a slightly larger diameter than the boss 34 so that fluid leaving the skirt portion will not strike the upper edge of the boss. We have found that where fluid strikes an edge of this character vibrations are very apt to occur but with this construction the fluid flows in a smooth quiet stream.

Still another inner end construction is illustrated in Figure 3 as comprising wall portion 36 formed with a seat 37 through which a valve stem 38 extends. The valve stem 38 is formed with an enlarged portion 39 adapted to seat against the seat 37 and terminating beyond the seat in a converging cone 41 connected to a reduced stem 42. The stem 42 is slidably supported in a tapered skirt 43 formed on a valve body 44 and terminates in a relative sharp edge adjacent the lower edge of the conical portion 41. In this construction fluid flowing through the seat will follow inwardly along the conical portion 41 and will be directed outwardly by the skirt 43 in a smooth continuous path, thus no vibrations will be set up in the stream.

Figure 4 illustrates in detail the construction of the seat and valve stem at the outer or large end of the valve. As shown in this figure the enlarged portion 18 above the seating part 21 is connected thereto by a radius to provide a smooth flow path and extends above the seating portion as a straight cylinder. The seat 13 lies at an acute angle to the valve stem to provide between the seat and the upper cylindrical portion 18 a diverging flow passage 45 diverging from a narrow throat 46 between the seat 13 and the seating portion 21 of the valve stem.

We have found that the angle 45 is quite critical since an excessive angle will cause the fluid to be excessively over-expanded at substantially all valve openings while an angle which is too small will cause either under-expansion of the fluid or mechanical seating difficulties or both. Angles at 45 in the range between 10 and 20 degrees are quite satisfactory and will produce the desired flow characteristics over a relatively wide range of valve opening. An angle of 15 degrees gives the best mechanical lift characteristics with minimum possibilities of valve sticking and will permit a wide range of valve movement without causing excessive over-expansion of fluid in the seat. Since any under-expansion in the seat is undesirable while a relatively small degree of over-expansion does not create any difficulties, we so design the valve both as to angle and as to seat length to provide for substantially complete expansion of the fluid by the time it leaves the seat at maximum valve opening. Thus for all openings less than maximum a slight over-expansion is created but if the angle at 45 is 20 degrees or less, the over-expansion does not become excessive although with angles exceeding 20 degrees excessive over-expansion at small valve openings would be very apt to occur.

The flow passage through the valve seat at the small or inner end of the valve is similarly designed although in this case we have found that somewhat greater angles will give satisfactory operation. Our tests have indicated that at the small end of the valve seating angles up to 25 degrees will function satisfactorily. This is probably due to the greater tendency of the fluid to flow along the stem so that a greater degree of over-expansion is permissible without causing the flow to split or flutter in the seat.

Another feature of the valve seat common to both the outer and inner ends is that the edge of the seat at the point where the fluid leaves it should be relative sharp as indicated at 47. We have found that fluid will break away more readily from a sharp or clean edge than from a rounded or smooth edge. Since it is desired that the fluid shall leave the seat and follow the stem it is advantageous to provide a sharp leaving edge as shown at 47 at the outlet side of the seat. The inlet side of the seat may be made either sharp or rounded as shown.

An alternative construction of the outer end of the valve is illustrated in Figure 5 which shows a body part 48 formed with a valve seat 49 through which a stem 51 extends. The stem 51 is cylindrical above the valve seat and passes slidably through a casing part 52. The stem has a conical tapered portion 53 providing a seating part within the seat and terminating in a stem or rod 54 below the conical part.

In this construction a flow passage through the seat as illustrated in Figure 4 is provided so that the fluid stream will be properly expanded and will flow along the stem 51 until it strikes and is turned out by the casing 52. We have found that a valve of this type will operate satisfactorily to provide smooth flow without objectionable vibration.

Still another alternative construction for the outer end of the valve is illustrated in Figure 6 including a casing part 55 formed with a valve seat 56. An enlarged valve member 57 lies within the seat and is formed with a seating portion above which is a flaring skirt or stem part 58, extending above the throat of the flow passage through the seat for a distance of at least ten times the throat width at maximum opening. A reduced stem 59 is connected to the enlarged valve part 57 and extends slidably through a casing part 61.

In operation of this valve the seat angle is so related to the flaring surface 58 as to provide proper expansion of the fluid in the flow passage in the seat. Thus the fluid stream will follow smoothly along the flaring skirt 58 and will leave it at its upper edge which is preferably a sharp edge. We have found that a construction of this type will provide smooth flow and will not create objectionable vibrations. The height of the skirt is quite important in a construction of this character since we have found that with shorter skirts whistling occurs at various ranges of valve operation. However, when the skirt is made to extend at least ten times the maximum throat opening above the throat the flow is smooth and objectionable vibrations are not set up.

This application is a continuation-in-part of our prior copending application, Serial No. 350,190 filed August 3, 1940.

While several embodiments of the invention have been shown and described in detail it will be understood that they are for the purpose of illustration only and are not to be taken as a definition of the scope of the invention, reference being had to the appended claims for this purpose.

What is claimed is:

1. In a valve construction for controlling the flow of fluid without vibration, the combination of an annular valve seat through which the fluid is adapted to flow, a valve stem extending through said seat and including a portion lying adjacent the seat and forming therewith an annular flow passage diverging at an angle not greater than 20°, the valve stem including a part extending beyond the throat of the flow passage for a distance equal to at least five times the width of the throat of the flow passage at maximum opening and slidably extending into a valve casing, said part being of such a size and contour as to provide for smooth flow of fluid therealong without any annular spaces over which the fluid must flow and without any sharp convex portions which would direct the fluid away from the part.

2. In a valve construction for controlling the flow of fluid without vibration, the combination of an annular valve seat through which the fluid is adapted to flow, a valve stem extending through said seat and including a portion lying adjacent the seat and forming therewith an annular diverging flow passage, the valve stem including a part extending beyond the throat of the flow passage for a distance equal to at least five times the width of the throat of the flow passage at maximum opening, said part flaring outwardly from the seat in the direction of fluid flow and terminating in a sharp leaving edge.

3. In a valve construction for controlling the flow of fluid without vibration, the combination of an annular valve seat through which the fluid is adapted to flow, a valve stem extending through said seat and including a portion lying adjacent the seat and forming therewith an annular flow passage diverging at an angle not greater than 20°, the valve stem including a part extending beyond the throat of the flow passage for a distance equal to at least five times the width of the throat of the flow passage at maximum opening, said part flaring outwardly from the seat in the direction of fluid flow and terminating in a sharp leaving edge.

4. In a valve construction for controlling the flow of fluid without vibration, the combination of an annular valve seat through which the fluid is adapted to flow, said valve seat being generally conical and terminating at its outlet side in a relatively sharp leaving edge, a valve stem extending through said seat and including a portion cooperating with the seat to define an annular flow passage, and a body portion having an annular skirt slidably surrounding the valve stem and terminating in a relatively narrow edge facing said flow passage.

5. In a valve construction, the combination of an annular valve seat through which fluid is adapted to flow, said valve seat being generally conical and converging in the direction of flow, a valve stem extending through said seat and having an enlarged portion cooperating therewith to define an annular flow passage diverging in the direction of flow at an angle not in excess of 25°, the valve stem at the outlet side of the seat converging for a relatively short distance and then flaring outwardly to direct fluid flowing along the stem outwardly therefrom.

6. In a valve construction, the combination of an annular valve seat through which fluid is adapted to flow, said valve seat being generally conical and converging in the direction of flow, a valve stem extending through said seat and having an enlarged portion cooperating therewith to define an annular flow passage, the valve stem at the outlet side of the seat converging to a reduced stem, and a valve body portion having an annular flaring skirt slidably surrounding the stem and terminating in a relatively narrow edge facing the flow passage.

7. In a valve construction for controlling the flow of fluid without vibration, the combination of an annular valve seat through which the fluid is adapted to flow, a valve stem extending through said seat and including a portion lying adjacent the seat and forming therewith an annular flow passage diverging at an angle not greater than 20°, the seat being of such length that the fluid flowing therethrough will be fully expanded by the time it leaves the seat when the valve is in its maximum open position, the seat terminating at its outlet side in a sharp leaving edge so that the fluid will break away from it cleanly, the valve stem including a part extending beyond the throat of the flow passage for a distance equal to at least five times the width of the throat of the flow passage at maximum opening said part being of such a size and contour as to provide for smooth flow of fluid therealong without any annular spaces over which the fluid must flow and without any sharp convex portions which might cause the fluid to break away from the part.

JOHN I. YELLOTT.
ROBERT A. ACKLEY.
ALBERT J. ROSENBERGER.